United States Patent
Jenkins et al.

(10) Patent No.: US 9,870,597 B2
(45) Date of Patent: Jan. 16, 2018

(54) SYSTEMS AND METHODS ALLOWING MULTI-FAMILY PROPERTY OWNERS TO CONSOLIDATE RETAIL ELECTRIC PROVIDER CHARGES WITH LANDLORD PROVIDED UTILITIES AND SERVICES

(71) Applicant: Conservice, LLC, Logan, UT (US)

(72) Inventors: David Jenkins, North Logan, UT (US); Greg Cole, Providence, UT (US); J. Matthew Miller, Logan, UT (US); Rich Seeley, Hyde Park, UT (US); Marc Treitler, San Diego, CA (US); Mike Lee, Logan, UT (US); Brett Kraus, Logan, UT (US)

(73) Assignee: Conservice, LLC, Logan, UT (US)

( * ) Notice: Subject to any disclaimer, the term of this patent is extended or adjusted under 35 U.S.C. 154(b) by 202 days.

(21) Appl. No.: 13/679,943

(22) Filed: Nov. 16, 2012

(65) Prior Publication Data

US 2013/0132244 A1    May 23, 2013

Related U.S. Application Data

(60) Provisional application No. 61/561,777, filed on Nov. 18, 2011.

(51) Int. Cl.
*G07B 17/00* (2006.01)
*G07F 19/00* (2006.01)
(Continued)

(52) U.S. Cl.
CPC .......... *G06Q 50/163* (2013.01); *G06Q 30/04* (2013.01); *G06Q 40/00* (2013.01)

(58) Field of Classification Search
None
See application file for complete search history.

(56) References Cited

U.S. PATENT DOCUMENTS

| 5,007,087 A | 4/1991 | Bernstein et al. |
| 5,566,099 A | 10/1996 | Shimada |

(Continued)

OTHER PUBLICATIONS

Forrest, Stephanie, Alan S. Perelson, Lawrence Allen and Rajesh Cherukuri, "Self-Nonself Discrimination in a Computer," In Proceedings of 1994 IEEE Symposium on Research in Security and Privacy, 1994, 11 pages.

(Continued)

*Primary Examiner* — Fateh M Obaid
(74) *Attorney, Agent, or Firm* — Knobbe, Martens, Olson & Bear, LLP

(57) ABSTRACT

Systems and methods for allowing landlords to combine information from a retail electric provider into landlord billed utilities and items, are described herein. In one aspect, residency information for a unit associated with a resident is received. Resource consumption or usage information associated with the unit is received from one retail electric provider. A consolidated data set is generated based on the resource consumption or usage information for the unit from both the retail electric provider and landlord provided services such as rent, water, trash and sewer. Under this process, a resident may choose to have the electric account remain in the landlord's name and then be billed for such retail electric charges on the same bill as the landlord provided utilities and services. In some implementations, the community will collect funds for the utility bills from each resident and will use such funds to pay the utility provider directly.

25 Claims, 14 Drawing Sheets

(51) Int. Cl.
  *G06Q 50/16* (2012.01)
  *G06Q 30/04* (2012.01)
  *G06Q 40/00* (2012.01)

(56) References Cited

U.S. PATENT DOCUMENTS

| | | | |
|---|---|---|---|
| 5,684,965 A * | 11/1997 | Pickering | 705/34 |
| 6,334,107 B1 * | 12/2001 | Gale et al. | 705/34 |
| 7,309,979 B2 * | 12/2007 | Angerame et al. | 324/103 R |
| 7,467,092 B2 | 12/2008 | Anderson et al. | |
| 7,774,245 B2 | 8/2010 | Voysey | |
| 8,073,705 B2 * | 12/2011 | Anderson et al. | 705/1.1 |
| 8,751,793 B2 * | 6/2014 | Ginter et al. | 713/156 |
| 2006/0045105 A1 * | 3/2006 | Dobosz et al. | 370/401 |
| 2010/0049637 A1 * | 2/2010 | Laventman et al. | 705/30 |
| 2011/0071951 A1 * | 3/2011 | John | 705/307 |
| 2011/0246342 A1 * | 10/2011 | Gibson et al. | 705/34 |

OTHER PUBLICATIONS

James, F. "A Review of Pseudorandom Number Generators," CERN Data Handling Division, Dec. 1, 1988, pp. i-14.

Randomness, Wikipedia, This page was last edited on Aug. 21, 2017, at 02:34 https://en.wikipedia.org/w/index.php?title=Randomness&oldid=796474085.

* cited by examiner

| # | Resident | Account # | Unit | Move In | Mult | Bedroom 5 | E1 Electric Supply Charges | E4 Advanced Metering Fee | E5 Electric Tax Charges | Electricity Service Fee | Sewer | Sewer Base | Trash | Water | Water Base Charge | Current Balance |
|---|---|---|---|---|---|---|---|---|---|---|---|---|---|---|---|---|
| 76 | ************ | 1197 | 0616 | 05/16/11 | 2.80 | 2.00 | | | | | 6.73 | 4.08 | 7.44 | 4.27 | 6.75 | 29.27 |
| 77 | ************ | 1201 | 0701 | 06/03/11 | 2.80 | 2.00 | | | | | 6.73 | 4.08 | 7.44 | 4.27 | 6.75 | 29.27 |
| 78 | ************ | 1130 | 0703 | 03/19/10 | 4.00 | 3.00 | | | | | 9.61 | 4.08 | 7.44 | 6.09 | 6.75 | 33.97 |
| 79 | ************ | 1115 | 0704 | 10/06/09 | 4.00 | 3.00 | | | | | 9.61 | 4.08 | 7.44 | 6.09 | 6.75 | 33.97 |
| 80 | ************ | 1213 | 0705 | 08/13/11 | 4.00 | 3.00 | 85.60 | 3.40 | 1.93 | 1.50 | 9.61 | 4.08 | 7.44 | 6.09 | 6.75 | 126.40 |
| 81 | ************ | 1069 | 0706 | 05/23/06 | 4.00 | 3.00 | | | | | 9.61 | 4.08 | 7.44 | 6.09 | 6.75 | 33.97 |
| 82 | ************ | 1127 | 0707 | 02/22/10 | 2.08 | 2.00 | | | | | 6.73 | 4.08 | 7.44 | 4.27 | 6.75 | 29.27 |
| 83 | ************ | 1133 | 0708 | 04/10/10 | 2.08 | 2.00 | | | | | 6.73 | 4.08 | 7.44 | 4.27 | 6.75 | 29.27 |
| 84 | ************ | 1115 | 0709 | 10/01/09 | 2.08 | 2.00 | | | | | 6.73 | 4.08 | 7.44 | 4.27 | 6.75 | 29.27 |
| 85 | ************ | 1031 | 0710 | 08/31/06 | 2.08 | 2.00 | | | | | 6.73 | 4.08 | 7.44 | 4.27 | 6.75 | 29.27 |
| 86 | ************ | 1165 | 0711 | 10/01/10 | 4.00 | 3.00 | | | | | 9.61 | 4.08 | 7.44 | 6.09 | 6.75 | 33.97 |
| 87 | ************ | 1207 | 0712 | 07/29/11 | 2.80 | 2.00 | | | | | 6.73 | 4.08 | 7.44 | 4.27 | 6.75 | 29.27 |
| 88 | ************ | 1064 | 0713 | 03/12/06 | 4.00 | 3.00 | | | | | 9.61 | 4.08 | 7.44 | 6.09 | 6.75 | 33.97 |
| 89 | ************ | 1197 | 0714 | 05/14/11 | 4.00 | 3.00 | | | | | 9.61 | 4.08 | 7.44 | 6.09 | 6.75 | 33.97 |
| 90 | ************ | 1138 | 0715 | 05/21/10 | 2.80 | 2.00 | | | | | 6.73 | 4.08 | 7.44 | 4.27 | 6.75 | 29.27 |
| 91 | ************ | 1201 | 0716 | 06/04/11 | 2.80 | 2.00 | | | | | 6.73 | 4.08 | 7.44 | 4.27 | 6.75 | 29.27 |
| 92 | ************ | 1155 | 0801 | 08/10/10 | 2.80 | 2.00 | | | | | 6.73 | 4.08 | 7.44 | 4.27 | 6.75 | 29.27 |
| 93 | ************ | 1111 | 0802 | 09/26/09 | 2.80 | 2.00 | | | | | 6.73 | 4.08 | 7.44 | 4.27 | 6.75 | 29.27 |
| 94 | ************ | 1025 | 0803 | 09/01/01 | 1.60 | 1.00 | | | | | 3.84 | 4.08 | 7.44 | 2.44 | 6.75 | 24.55 |
| 95 | ************ | 1207 | 0804 | 07/01/11 | 1.60 | 1.00 | | | | | 3.84 | 4.08 | 7.44 | 2.44 | 6.75 | 24.55 |
| 96 | ************ | 1025 | 0805 | 03/08/03 | 1.60 | 1.00 | | | | | 3.84 | 4.08 | 7.44 | 2.44 | 6.75 | 24.55 |
| 97 | ************ | 1201 | 0806 | 06/03/11 | 2.80 | 2.00 | | | | | 6.73 | 4.08 | 7.44 | 4.27 | 6.75 | 29.27 |
| 98 | ************ | 1192 | 0807 | 04/25/11 | 2.80 | 2.00 | | | | | 6.73 | 4.08 | 7.44 | 4.27 | 6.75 | 29.27 |
| 99 | ************ | 1170 | 0811 | 11/08/10 | 1.60 | 1.00 | | | | | 3.84 | 4.08 | 7.44 | 2.44 | 6.75 | 24.55 |
| 100 | ************ | 1108 | 0812 | 08/18/09 | 1.60 | 1.00 | | | | | 3.84 | 4.08 | 7.44 | 2.44 | 6.75 | 24.55 |
| 101 | ************ | 1197 | 0813 | 05/30/11 | 1.60 | 1.00 | | | | | 3.84 | 4.08 | 7.44 | 2.44 | 6.75 | 24.55 |
| 102 | ************ | 1025 | 0815 | 10/18/05 | 2.80 | 2.00 | | | | | 6.73 | 4.08 | 7.44 | 4.27 | 6.75 | 29.27 |
| 103 | ************ | 1160 | 0816 | 09/04/10 | 2.80 | 2.00 | | | | | 6.73 | 4.08 | 7.44 | 4.27 | 6.75 | 29.27 |
| 104 | ************ | 1155 | 0901 | 08/10/10 | 2.80 | 2.00 | | | | | 6.73 | 4.08 | 7.44 | 4.27 | 6.75 | 29.27 |
| 105 | ************ | 1025 | 0902 | 03/24/06 | 2.80 | 2.00 | | | | | 6.73 | 4.08 | 7.44 | 4.27 | 6.75 | 29.27 |
| 106 | ************ | 1102 | 0904 | 06/27/09 | 4.00 | 3.00 | | | | | 9.61 | 4.08 | 7.44 | 6.09 | 6.75 | 33.97 |
| 107 | ************ | 1207 | 0905 | 07/01/11 | 4.00 | 3.00 | | | | | 9.61 | 4.08 | 7.44 | 6.09 | 6.75 | 33.97 |
| 108 | ************ | 1025 | 0907 | 12/26/05 | 2.80 | 2.00 | | | | | 6.73 | 4.08 | 7.44 | 4.27 | 6.75 | 29.27 |
| 109 | ************ | 1124 | 0909 | 01/23/10 | 2.80 | 2.00 | | | | | 6.73 | 4.08 | 7.44 | 4.27 | 6.75 | 29.27 |
| 110 | ************ | 1108 | 0910 | 08/14/09 | 2.80 | 2.00 | | | | | 6.73 | 4.08 | 7.44 | 4.27 | 6.75 | 29.27 |
| 111 | ************ | 1183 | 0911 | 01/31/11 | 4.00 | 3.00 | | | | | 9.61 | 4.08 | 7.44 | 6.09 | 6.75 | 33.97 |
| 112 | ************ | 1121 | 0912 | 12/28/09 | 4.00 | 3.00 | | | | | 9.61 | 4.08 | 7.44 | 6.09 | 6.75 | 33.97 |
| 113 | ************ | 1197 | 0913 | 05/09/11 | 4.00 | 3.00 | | | | | 9.61 | 4.08 | 7.44 | 6.09 | 6.75 | 33.97 |

UTILITIES INFO

CONSERVICE UTILITY MANAGEMENT & BILLING

Your Account History

Below are the chargers & payments that have been posted to your account, as of today.

| Date | Description | Charges | payments | Balance |
|---|---|---|---|---|
| 10/01/2011 | Water for 08/13/11-08/19/11 | $0.74 | | |
| 10/01/2011 | Sewer for 08/13/11-08/19/11 | $1.92 | | |
| 10/01/2011 | Trash for 08/13/11-08/19/11 | $1.92 | | |
| 10/01/2011 | Water Base Charge for 08/13/11-08/19/11 | $1.74 | | |
| 10/01/2011 | Sewer Base for 08/13/11-08/19/11 | $1.05 | | |
| 10/01/2011 | Total monthly Charges | | | $7.37 |
| 11/01/2011 | E1 Electric Supply Charges for 08/19/11-09/21/11 | $85.60 | | |
| 11/01/2011 | Electricity Service Fee for 08/19/11-09/21/11 | $1.50 | | |
| 11/01/2011 | E5 Electric Tax Charges for 08/19/11-09/21/11 | $1.93 | | |
| 11/01/2011 | E4 Advanced Meeting Fee for 08/19/11-09/21/11 | $3.40 | | |
| 11/01/2011 | Sewer Base for 08/19/11-09/21/11 | $4.08 | | |
| 11/01/2011 | Water for 08/19/11-09/21/11 | $6.09 | | |
| 11/01/2011 | Sewer for 08/19/11-09/21/11 | $9.61 | | |
| 11/01/2011 | Trash for 08/19/11-09/21/11 | $7.44 | | |
| 11/01/2011 | Water Base Charges for 08/19/11-09/21/11 | $6.75 | | |
| 11/01/2011 | Total Monthly Charges | | | $126.40 |

- Home
- Your Previous Bills
- Sign-up for E-Bills
- Bill Facts
- E-Bill History
- Feedback
- Account Settings
- Conservation Tips
- 12138320 Go
- Logout Contact Conservice
Our toll-free phone #:
1-866-947-7379

Our E-mail:
Service@conservice.com

Hours:
Monday - Friday
Eastern: 8 a.m. - 10 p.m.
Central: 7 a.m. - 9 p.m.
Mountain: 6 a.m. -8 p.m.

| Page # | Processed | Service Address | Utility | Begin | End | # of Days | Movein Date | # of Day Cycle |
|---|---|---|---|---|---|---|---|---|
| 2 | 11/14/2011 11:4.... | ************ | Vacant Electric | 9/27/2011 | 10/21/2011 | 25 | 10/21/2011 | 1 |
| 2 | 11/10/2011 3:32.... | ************ | Vacant Electric | 9/7/2011 | 9/14/2011 | 8 | 9/13/2011 | 2 |
| 8 | 11/14/2011 11:4.... | ************ | Vacant Electric | 9/27/2011 | 10/26/2011 | 30 | 4/30/2011 | 180 |
| 4 | 11/14/2011 11:4.... | ************ | Vacant Electric | 9/27/2011 | 10/26/2011 | 30 | 7/8/2011 | 111 |
| 5 | 11/14/2011 11:4.... | ************ | Vacant Electric | 9/27/2011 | 10/26/2011 | 30 | 3/17/2009 | 354 |
| 3 | 11/14/2011 11:4.... | ************ | Vacant Electric | 9/27/2011 | 10/26/2011 | 30 | 5/5/2011 | 175 |
| 4 | 11/14/2011 11:4.... | ************ | Vacant Electric | 9/27/2011 | 10/27/2011 | 31 | 10/24/2011 | 4 |
| 7 | 11/14/2011 11:4.... | ************ | Vacant Electric | 9/27/2011 | 10/26/2011 | 29 | 8/25/2011 | 32 |
| 2 | 11/10/2011 3:32.... | ************ | Vacant Electric | 8/16/2011 | 8/17/2011 | 2 | 7/16/2011 | 33 |
| 6 | 11/10/2011 3:32.... | ************ | Vacant Electric | 9/23/2011 | 10/25/2011 | 33 | 9/24/2011 | 216 |
| 14 | 11/10/2011 3:32.... | ************ | Vacant Electric | 10/10/2011 | 10/24/2011 | 15 | 10/16/2011 | 3 |
| 2 | 11/10/2011 3:32.... | ************ | Vacant Electric | 8/23/2011 | 9/1/2011 | 10 | 9/1/2011 | 1 |
| 10 | 11/10/2011 3:32.... | ************ | Vacant Electric | 9/23/2011 | 10/25/2011 | 33 | 5/22/2011 | 522 |
| 19 | 11/10/2011 3:32.... | ************ | Vacant Electric | 9/23/2011 | 10/25/2011 | 33 | 10/29/2010 | 362 |
| 2 | 11/10/2011 3:32.... | ************ | Vacant Electric | 9/23/2011 | 10/14/2011 | 22 | 6/26/2010 | 476 |
| 5 | 11/10/2011 3:32.... | ************ | Vacant Electric | 9/23/2011 | 10/25/2011 | 33 | 6/26/2010 | 487 |
| 17 | 11/10/2011 3:32.... | ************ | Vacant Electric | 9/23/2011 | 10/25/2011 | 33 | 7/1/2011 | 117 |
| 9 | 11/10/2011 3:32.... | ************ | Vacant Electric | 10/7/2011 | 10/24/2011 | 18 | 10/21/2011 | 4 |
| 2 | 11/10/2011 3:32.... | ************ | Vacant Electric | 9/23/2011 | 10/25/2011 | 33 | 5/1/2010 | 543 |
| 12 | 11/10/2011 3:32.... | ************ | Vacant Electric | 8/16/2011 | 8/17/2011 | 2 | 1/1/2009 | 359 |
| 2 | 11/10/2011 3:32.... | ************ | Vacant Electric | 9/23/2011 | 10/25/2011 | 33 | 6/1/2008 | 1242 |
| 2 | 11/10/2011 3:32.... | ************ | Vacant Electric | 10/13/2011 | 10/14/2011 | 2 | 10/14/2011 | 1 |
| 11 | 11/10/2011 3:32.... | ************ | Vacant Electric | 8/23/2011 | 10/24/2011 | 32 | 8/17/2011 | 69 |

Submit Action

| Processed | Service Address | Utility | Begin | End | # of Days | Movein Date | # of Day Cycle |
|---|---|---|---|---|---|---|---|
| 11/10/2011 3:32... | *************** | Vacant Electric | 8/8/2011 | 8/23/2011 | 16 | 8/13/2011 | 11 |
| 11/10/2011 3:32... | *************** | Vacant Electric | 9/23/2011 | 10/25/2011 | 33 | 2/25/2011 | 243 |
| 11/10/2011 3:32... | *************** | Vacant Electric | 9/23/2011 | 10/25/2011 | 33 | 8/1/2011 | 86 |
| 11/10/2011 3:32... | *************** | Vacant Electric | 9/23/2011 | 10/24/2011 | 32 | 6/8/2011 | 139 |
| 11/10/2011 3:32... | *************** | Vacant Electric | 9/23/2011 | 10/24/2011 | 32 | 12/1/2010 | 328 |
| 11/10/2011 3:32... | *************** | Vacant Electric | 9/23/2011 | 10/24/2011 | 32 | 9/9/2011 | 46 |
| 11/10/2011 3:32... | *************** | Vacant Electric | 10/7/2011 | 10/25/2011 | 19 | 10/13/2011 | 7 |
| 11/10/2011 3:32... | *************** | Vacant Electric | 9/23/2011 | 10/25/2011 | 33 | 7/23/2011 | 95 |
| 11/10/2011 3:32... | *************** | Vacant Electric | 10/11/2011 | 10/25/2011 | 15 | 10/22/2011 | 4 |
| 11/10/2011 3:32... | *************** | Vacant Electric | 9/23/2011 | 10/25/2011 | 33 | 6/16/2011 | 71 |
| 11/10/2011 3:32... | *************** | Vacant Electric | 10/11/2011 | 10/25/2011 | 15 | 10/17/2011 | 9 |
| 11/10/2011 3:32... | *************** | Vacant Electric | 9/23/2011 | 10/24/2011 | 32 | 8/20/2011 | 66 |
| 11/10/2011 3:32... | *************** | Vacant Electric | 9/23/2011 | 10/25/2011 | 33 | 5/15/2011 | 164 |
| 11/10/2011 3:32... | *************** | Vacant Electric | 9/23/2011 | 10/25/2011 | 33 | 9/1/2011 | 55 |
| 11/10/2011 3:32... | *************** | Vacant Electric | 9/30/2011 | 10/25/2011 | 26 | 10/7/2011 | 19 |
| 11/10/2011 3:32... | *************** | Vacant Electric | 9/23/2011 | 10/24/2011 | 32 | 9/27/2011 | 28 |
| 11/10/2011 3:32... | *************** | Vacant Electric | 9/23/2011 | 10/25/2011 | 33 | 9/29/2011 | 27 |
| 11/10/2011 3:32... | *************** | Vacant Electric | 9/23/2011 | 10/25/2011 | 33 | 7/25/2011 | 93 |
| 11/10/2011 3:32... | *************** | Vacant Electric | 9/23/2011 | 10/25/2011 | 33 | 4/18/2011 | 191 |
| 11/10/2011 3:32... | *************** | Vacant Electric | 9/23/2011 | 10/25/2011 | 33 | 10/1/2011 | 25 |
| 11/10/2011 3:32... | *************** | Vacant Electric | 9/23/2011 | 10/25/2011 | 33 | 9/1/2011 | 55 |
| 11/10/2011 3:32... | *************** | Vacant Electric | 9/23/2011 | 10/25/2011 | 33 | 2/1/2011 | 267 |
| 11/10/2011 3:32... | *************** | Vacant Electric | 9/23/2011 | 10/25/2011 | 33 | 10/21/2011 | 5 |

Submit Action

SYSTEMS AND METHODS ALLOWING MULTI-FAMILY PROPERTY OWNERS TO CONSOLIDATE RETAIL ELECTRIC PROVIDER CHARGES WITH LANDLORD PROVIDED UTILITIES AND SERVICES

CROSS-REFERENCE TO RELATED APPLICATIONS

This application claims the benefit of U.S. Provisional Patent Application No. 61/561,777, entitled "Systems and Methods Allowing Multi-Family Property Owners to Consolidate Retail Electric Provider Charges with Landlord Provided Utilities and Services," filed Nov. 18, 2011, which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field

The present application relates generally to property management, and more specifically to systems and methods for multi-family property owners (referred to herein also as landlords, which by reference also refers to owners, managers, leasing agents, etc.) to manage a utility expense pass through system for resident utility charges by specifically consolidating third party retail electric provider charges with traditional landlord billed utilities and services such as water, sewer, trash, pest, cable service, pet fees, and rent.

Background

Multi-family property owners maintain and control individual units. When a resident moves into a unit at a multi-family dwelling, that resident is in charge of obtaining electric service for their specific unit. Each time a resident moves in and out of a unit, there is an added expense to the property owner from a utility company for the transferring of service from one customer to another. Also, individual residents are unable to negotiate compellingly with utility companies for highly competitive rates, whereas multi-family property owners often have enough volume to demand better rates. Such negotiation is especially attractive in areas with deregulated utility services.

In such deregulated localities, residents need to contract directly with a retail electric provider. This requires the resident to independently obtain information and rates from one or more retail electric providers. Once a retail electric provider is selected the resident will be billed directly from that entity in addition to other bills he may receive from the landlord including rent, water, sewer, trash, pest control, etc.

Moreover, in deregulated areas such as portions of Texas, landlords are subject to certain fees based on events out of their control. Specifically, in Texas when a resident moves out of his apartment, the landlord is liable for a reconnection charge on each such occasion. These costs vary from, for example, $3.00 to $54.00 on each occasion depending on the location of the property. Therefore, improved systems and methods for combining information from multiple services are desired.

SUMMARY

The system described herein eliminates the above mentioned charges as the retail electric service stays in the name of the landlord. Accordingly, systems and methods that facilitate a landlord to combine information from multiple services, including a third party retail electric provider, are described. In some instances, the multi-family property owner or third party billing company may choose to own a utility provider to be able to control expenses and more fully take advantage of these benefits. Moreover, systems and methods that allow multi-family property owners or a third party billing company to receive a single utility invoice for all vacant and occupied units for their community and from that invoice individually bill all occupied units for their exact charges are desired. Moreover, this invention will allow multi-family property owners to receive a single utility invoice for all vacant and occupied units for their community and from that invoice individually bill all occupied units for their exact charges.

In one innovative aspect, a method of providing a digital record pertaining to multi-resident property via a computer network is provided. The method includes storing an electronic residency record for a unit associated with a resident. The method also includes receiving a resource consumption or usage electronic record associated with the unit from a retail electric provider, the resource consumption or usage electronic record including information indicative of one or more of electricity usage and pricing information of the electricity used for the unit. The method further includes generating a consolidated electronic data set based on the resource consumption or usage electronic record for the unit as provided by the retail electric provider, the consolidated data set including the received retail electric provider information and resource consumption or usage information from at least one of a plurality of landlord provided services, the plurality of landlord provided services including at least one of water, sewer, trash, pest, cable service, rent, and pet fees.

In another innovative aspect, another method of providing a digital record pertaining to multi-resident property via a computer network is provided. The method includes providing an electronic resident information interface configured to associate a resident with a unit. The method also includes receiving an electronic record including information indicative of at least one of electricity usage for the unit and pricing information for the electricity used from a retail electric provider. The method further includes importing at least a portion of the electronic record from the retail electric provider indicative of one or more of electricity usage and costs into the resident information interface.

In a further innovative aspect, a system for providing information pertaining to multi-resident property is provided. The system includes means for receiving and storing electronic residency record information for a unit associated with a resident. The system includes means for receiving a resource consumption or usage electronic record information from a retail electric provider and from at least one provider of landlord provided services, the landlord provided services including one or more of water, sewer, trash, pest, cable service, rent, and pet fees, the resource consumption or usage electronic record including information indicative of one or more of electricity usage and pricing information of the electricity used for the unit. The system also includes means for generating a consolidated electronic data set based on the resource consumption or usage information electronic record for the unit, the consolidated data set including the received retail electric provider information and the received resource consumption or usage information for the landlord provided services.

In yet another innovative aspect, a non-transitory computer readable storage medium comprising instructions executable by a processor of an apparatus is provided. The instructions cause the apparatus to receive and/or store an electronic residency record including information for a unit associated with a resident. The instructions further cause the apparatus to receive a resource consumption or usage information electronic record associated with the unit from a plurality of disparate entities, including one retail electric provider, the resource consumption or usage electronic record including information indicative of one or more of resource usage and pricing information of the resource used for the unit. The instructions cause the apparatus to generate a consolidated electronic data set based on the resource consumption or usage information electronic record for the unit received from each of the plurality of disparate entities.

The systems and methods described each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features described provide advantages that include one bill for resident charges associated with their lease, including but not limited to rent, utility charges, and other ancillary fees as applicable.

BRIEF DESCRIPTION OF THE DRAWINGS

FIGS. 5A and 5B illustrate example reports based on exemplary aspects.

FIGS. 6A and 6B illustrate example user interfaces based on other exemplary aspects.

FIGS. 7A and 7B illustrate example interfaces that may be used to coordinate the multi-unit bill distribution.

DETAILED DESCRIPTION

Figure 1:
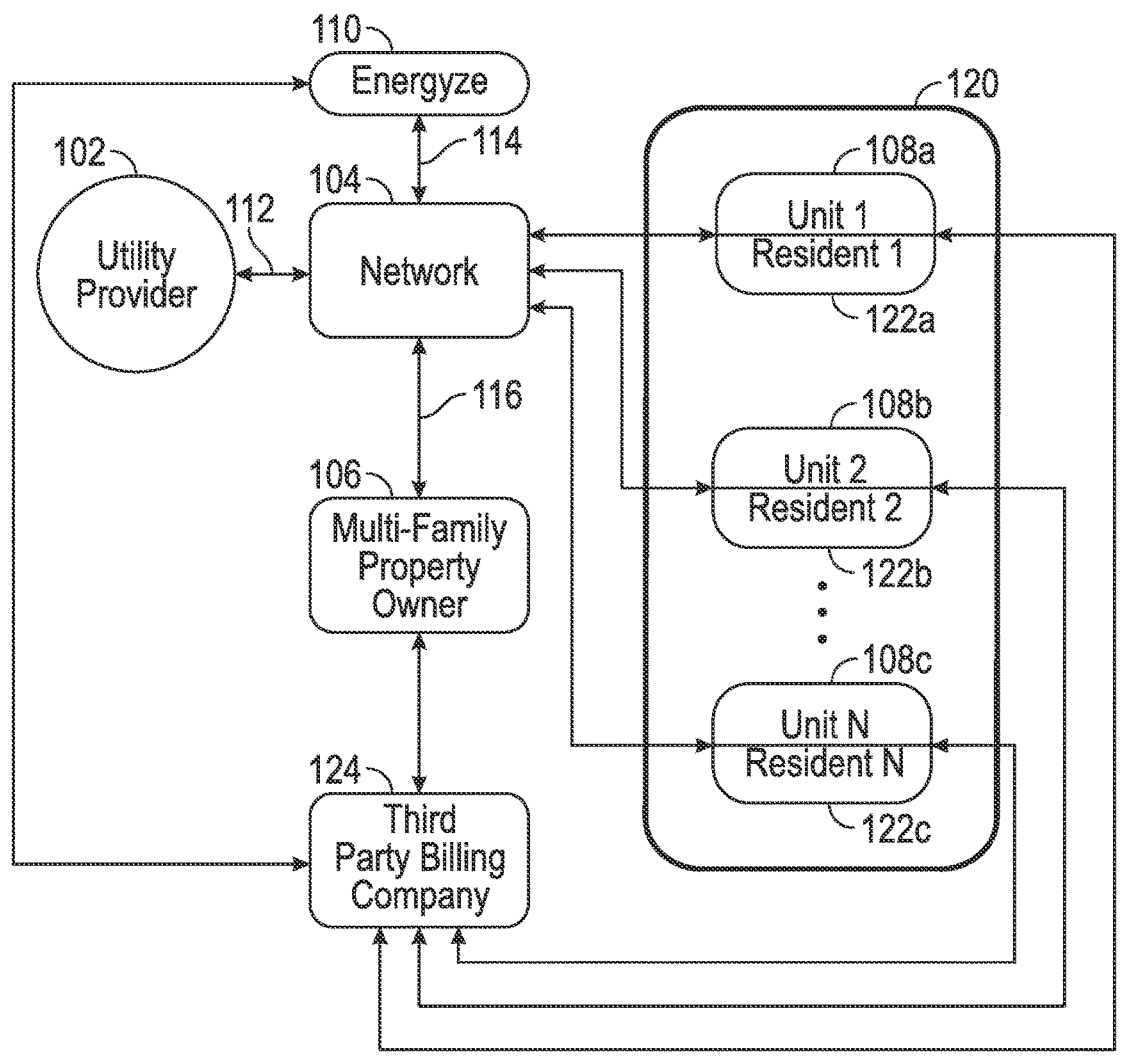
FIG. 1 shows a functional block diagram of an exemplary system for processing resource consumption or usage information.

The word "exemplary" is used herein to mean "serving as an example, instance, or illustration." Any aspect or embodiment described herein as "exemplary" is not necessarily to be construed as preferred or advantageous over other aspects or embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different communication technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In some aspects, all data indicative of resource consumption or usage associated with all units at a multifamily dwelling may be captured, associated, and included in a single bill for the multi-family dwelling. The resident, having a choice, may allow a landlord to serve as the customer of record for resource consumption or usage services such as electricity from a retail electric provider, permitting the landlord or a third party billing company to receive all bills and in turn provide a single bill to the resident covering all expenses billed from the multi-family dwelling to the resident. An information management system is discussed herein that enables a multi-family landlord to consolidate charges incurred by all of their residents and provide a single bill for use from all such residents, and subsequently divide that bill out by unit for rebilling by a third party billing company to each individual resident, including specifically the charges from a retail electric provider. The processes described provide a bill based on the consumption for the unit. Each unit may be billed based on the resource consumption for the unit. Furthermore, each unit may be billed using different cost bases. For example, in a mixed used property, a commercial unit may receive electricity under a demand pricing model, while a residential unit may receive electricity under a per service unit cost model. Service units may be indicated in therms, gallons, watts, kilowatts, or British thermal units. The systems and methods described allow landlords to apply these different models to different units and to generate the costs for each unit based on the resource consumed by each unit.

In a deregulated market where electricity may be purchased from more than one provider, and each provider at a different rate, residents and landlords may experience additional benefits. In one aspect, residents may receive lower resource consumption or usage service rates since landlords may have improved bargaining power, among other advantages, when contracting with service providers such as a retail electric provider (REP). In another aspect, landlords may experience a competitive advantage using such a resident multi-service information management system since the system may offer less hassle to residents, making a landlord's units more desirable.

FIG. 1 shows a functional block diagram of an exemplary system for processing resource consumption or usage information. A plurality of utility service providers 102 may be available for each multi-family dwelling, however this diagram shows a system configuration for an individual deregulated utility provider. It will be understood that the processes and systems described may be configured to support multiple service providers of the same or different types. Each utility service provider 102 provides a resource or service via path 112 to the network 104 including usage, service dates, rate information, late fee charges, etc. on a minimal number of bills. The network communicates via path 114 data collected from the utility provider to the multi-unit bill distribution system (ENERGyZE) 110 to process the information.

The multi-unit bill distribution system 110 processes each piece of information, assigning charges to each individual unit, and then to each person responsible for that unit. The multi-unit bill distribution system 110 then sends this data back to the network 104 where all charges have been separated out by resident 122, and is then sent to the multifamily property owner 106. At that point, the multi-family property owner 106, or their third party billing company 124 may assign all additional charges they wish to a bill, or combine multiple utility charges onto a single bill. Once these bills are set and approved for each resident, the bills get sent from the multi-family property owner 106 back to the network 104 where they are then distributed to each individual resident, identified as 108 collectively.

The resident associated with a particular unit 108 may access the resident 122 information management via the network 104 to view service data for services provided to the resident's associated unit 108. For example, a resident 122a associated with unit 108a may access the resident multi-service information developed by the multi-family property owner 106 or the third-party billing company 124 via the network 104 to view service data for services provided to the unit 108a.

Additionally, the multi-family property owner 106 may access the resident bills via the network 104 to view service information for the units 108 under management at the property 120. In yet other aspects, the multi-family property owner 106 may view information indicative of resource consumption or usage for other units not under the management of the multi-family property owner 106. The multi-family property owner 106 on their own or through a third party billing company 124 may prepare billing statements or export billing information gathered from the multi-unit bill distribution system 110 via the network 104. Furthermore, residents 122 may be able to pay either the multi-family property owner 106 or the third party billing company 124 for all such charges. The entity receiving payment may then use resident 122 funds to pay charges to the utility service provider 102.

The multi-unit bill distribution system 110 may receive the information in different formats from each service provider 102. The multi-unit bill distribution system 110 may be configured to parse information from the providers to identify particular units as well as other usage information including quantity of service used, total cost, and tariffs, etc. The multi-unit bill distribution system 110 may include a database to store the information for each property 120 and unit 108. The multi-unit bill distribution system 110 may be configured to generate bills for each unit 108. This functioning of the system does not markedly change whether the utility is owned by the multifamily property owner 106 or the third party billing company 124.

Figure 2:
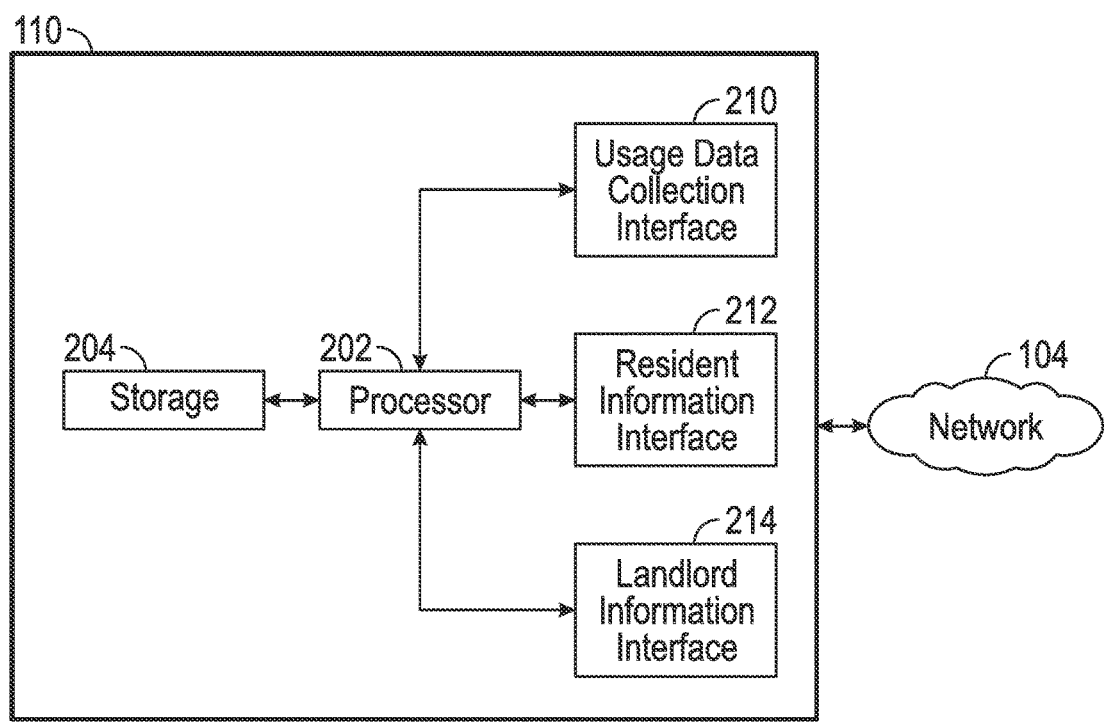
FIG. 2 shows a functional block diagram of an exemplary multi-unit bill distribution system shown in FIG. 1.

FIG. 2 shows a functional block diagram of an exemplary multi-unit bill distribution system 110. The multi-unit bill distribution system 110 comprises a processor 202, a storage 204, a usage data collection interface 210, a resident information interface 212, and a landlord information interface. The multi-unit bill distribution system 110 communicates through the network 104 to the usage data collection interface 210, the resident information interface 212, and the landlord information interface 214.

The usage data collection interface 210 may receive information indicative of resource consumption or usage from many different service providers 102. In some aspects, service providers 102 may include retail electric providers, and utilities traditionally billed by the landlord such as water, sewer, trash, and cable providers, among others. The data usage collection interface 210 may also be configured to receive information indicative of resource consumption or usage from a device configured to meter such resource consumption or usage. For example, the metering device may be a smart meter.

The usage data collection interface 210 may receive information in different formats from each service provider 102. The information indicative of resource consumption or usage data may include meter readings, unit amounts, dollar values, time periods, etc. In particular aspects, the usage data collection interface 210 may comprise a software or website interface for receiving information from the service providers 102.

The processor 202 may be configured to process information displayed, received, or transmitted by the usage data collection interface 210. The processor 202 in one aspect may be configured to parse information from the providers to identify particular units as well as other resource consumption or usage information. For example, the processor may parse the quantity of a service used by a particular unit, the total cost of the services, and any tariffs, among other possibilities.

The processor 202 may comprise or be a component of a processing system implemented with one or more processors. The one or more processors may be implemented with any combination of general-purpose microprocessors, microcontrollers, digital signal processors, or any other suitable entities that can perform calculations or other manipulations of information. The processor 202 may also include memory, which may include both read-only memory and random access memory, may provide instructions and data to the processor 202. The processor 202 typically performs logical and arithmetic operations based on program instructions stored within the memory 202. The instructions in the memory 202 may be executable to implement the methods described herein.

The processor 202 may be further configured to communicate with a storage 204 configurable to store information. The processor 202 may store information received from service providers 102 without modification, in a compressed or encoded form, or results of calculations based on the information. The information may also be stored and separated based on each property 120 or each unit 108.

The storage 204 may comprise various computer components or recording media that retain information. The storage 204 may include a database, cloud data storage service, cluster shared volumes (CSV) arrangement, flat file, or other information storage file or systems.

The resident information interface 212 may provide a medium for communicating with the resident of a unit about the resource consumption or usage of the unit. A resident may connect to the resident information interface 212 through the network 104 via a networked device such as a computer, laptop, smartphone, and the like. The resident may login to access features of the resident information interface 212. Via the resident information interface 212, the resident may enable delivery of particular resource consumption or usage information about the unit 108 associated with the resident. The resident may also customize aspects of the resident information interface 212 such as the order the resources are displayed, look-and-feel of the display, amount of data displayed, and units used for display. The resource consumption or usage information may comprise information such as electricity usage, water/sewage costs, trash costs, resource cost, fees, tariffs, taxes, and other consumption metrics or unit charges, etc.

The landlord information interface 214 may provide a medium for communicating with the multi-family property owner 106 of a property 120 about relevant resource consumption or usage. In some aspects, the landlord may connect to the landlord information interface 214 through the network 104. The multi-family property owner 106 may then login to access features of the landlord information interface 214 and enable delivery of particular resource consumption or usage information for the property 120 managed by the multi-family dwelling 106. The multi-family property owner 106 may view and, on their own or through a third party billing company 124, generate monthly bills for each unit 108 associated with the property 120. The multi-family property owner 106 or third party billing company 124 may then send a single bill for each unit to collect rent and all resource consumption or usage costs such as electricity, sewage, and trash, among others, associated with each unit 108. In yet other aspects, the multi-family property owner 106 may connect the landlord information interface 214 to an expense management system for billing. The expense management system may receive information from the landlord information interface to prepare a complete, single bill as opposed to the landlord information interface 214 computing and providing such information.

Although a number of separate components are illustrated in FIGS. 1 and 2, those of skill in the art will recognize that one or more of the components may be combined or commonly implemented. For example, the processor 202 may be used to implement not only the functionality described above with respect to the processor 202, but also to implement the functionality described above with respect to the usage data collection interface 210 and/or the resident information interface 212. Further, each of the components illustrated in FIG. 2 may be implemented using a plurality of separate elements.

Moreover, components or the entirely of the multi-unit bill distribution system 110 may be programmed using various coding languages such as C-Sharp or C++, via a framework such as Microsoft Visual Studio.

Figure 3:
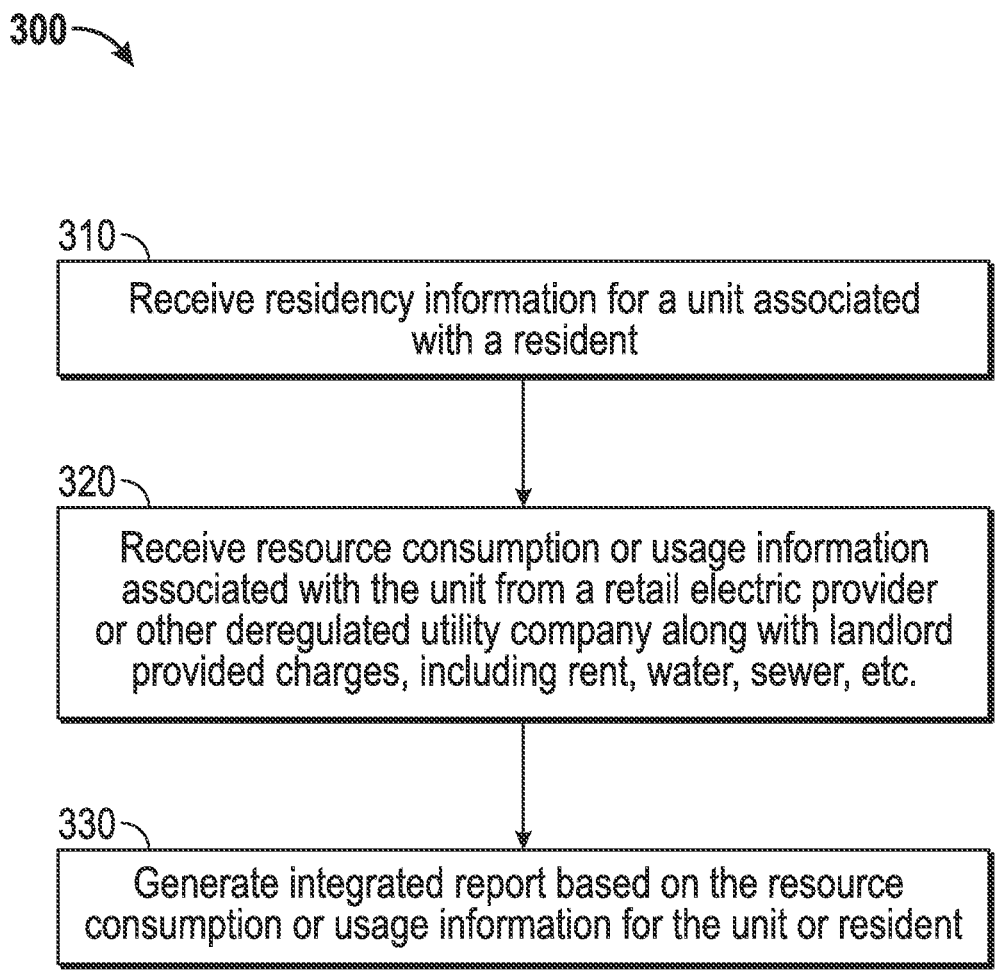
FIG. 3 is a flowchart of an exemplary method for collecting and utilizing resource consumption or usage information.

FIG. 3 is a flowchart of an exemplary method 300 for collecting and utilizing resource consumption or usage information. The method 300 may be used by a multi-family property owner 106 or third party billing company 124 to prepare a single bill comprising retail electric provider usage and cost charges, trash, sewage, and cable, among other charges, for a resident. Although the method 300 is described below with respect to the elements of the multi-unit bill distribution system 110, those having ordinary skill in the art will appreciate that other components may be used to implement one or more of the steps described herein.

At block 310, residency information for a unit associated with a resident is received. Receiving the information may include storing an electronic residency record including residency information. The residency information may comprise details about resident (e.g., name, birth date, social security number, driver's license number, photograph, thumbprint or other biometric indicator) and billing information for units (e.g., address, unit number, location, applicable tariffs, rent, fees, payor). The residency information may be used to associate resource consumption or usage information with the unit and the resident that incur the cost. In other aspects, the residency information may be used to allocate costs of resource consumption or usage. The receipt of residency information may be performed by the usage data collection interface 210 or resident information interface 212, for example. In some implementations, the residency information is collected as part of the move in process.

The residency information may include an election to enroll in the multi-unit bills distribution system in a lease agreement or other authorized contract. For example, at the time of move-in, a resident may have several options for utility provisioning including: (1) selecting to use the disclosed systems and methods for multi-family dwellings to manage a utility expense pass through system for resident utility charges by specifically consolidating third party retail electric provider charges with traditional landlord provided utilities and services such as water, sewer, trash, pest and rent; and (2) contracting individually with a utility company of their choosing. The multi-unit bills distribution system shall identify which units have opted out of the described systems and methods and allow the multi-family dwelling the ability to use industry appropriate procedures to manage charges belonging to said units that have opted out of the multi-unit bills distribution system.

At block 320, resource consumption or usage information associated with the unit from a plurality of disparate entities is received. The information may be received via a resource consumption or usage electronic record associated with the unit. The information includes information indicative of resource usage such as an amount of resource used and pricing information for the resources used. The receipt of resource consumption, usage, or other utility information may be performed by the usage data collection interface 210, for example.

At block 330, a consolidated electronic data set based on the resource consumption or usage information is generated. The consolidation may be based in part on the residency information and the received resource consumption or usage information. The consolidation may include comparing one or more data elements from the resource consumption or usage information to an element of residency information. For example, the resource consumption information may include an address and a unit number. In one implementation, the processor 202 may generate the data set by comparing the addresses in the resource consumption information to the address and unit residency information. If the address and/or unit on the resource consumption information match the address and unit residency information, the information may be integrated for this unit. Other methods of integrating the data may be used such as mapping of disparate account numbers from each resource provider to a unit, fuzzy logic, or statistical analysis. In some implementations, the consolidated electronic data set may be generated for a property including hundreds of units, each receiving a resource from multiple resource providers. By applying one or more of the processes described herein, such a large data set may be automatically generated in an efficient and accurate manner.

The integration of the data set may include several forms of aggregation. For example, in some implementations, the integration may sum the total charges for each provider and present a total amount due. This may allow a single report to be presented to a resident. In some implementations, the generated report may represent a bill for a resident. The multi-unit bill distribution system 110 may include a fulfillment module configured to print and/or mail the bills to individual residents. The multi-unit bill distribution system 110 may print the bills, either physically or electronically, and provide the bills to a multi-family property owner 106 or third party billing company 124 for distribution. Payments may be made and/or collected by a single entity, whether by a third party billing company 124 or the multi-family property owner 106 for multiple provider charges. In some implementations, the multi-unit bill distribution system 110 may be configured to receive single payments from residents and parse the payment amounts for each provider. In this way, a single invoice may be used to communicate disparate charges and receive payment therefore. In some implementations, the payment processing may include receiving payment information (e.g., one or more source of funds, associated unit, associated invoice, amount, payment data), verifying the received payment information, and/or applying the payment to the related account. The verification may include transmitting a portion of the payment information to a financial institution to confirm the payment source and/or available funds. The verification may include comparing the amount, invoice, and unit information with electronic records stored by the multi-unit bill distribution system 110. Applying the payment information may include altering an electronic record stored by the multi-unit bill distribution system 110 so as to identify the date and amount of payment. Other payment information may also be stored for the current payment, a scheduled one-time payment, or a scheduled recurring payment. In some implementations, the multi-unit bill distribution system 110 may generate a notification of payment including an indication of the amount paid and other account information (e.g., remaining balance, property information, move out date)

When a provider bill is issued and a resident has been billed, the multi-unit bill distribution system 110 may use the resident's money (e.g., money from an account linked to the resident, credit/debit card linked to the resident) to pay the provider's bill. In some instances, the resident may be obligated to pay the bill regardless of the name on the bill (e.g., the landlord's name). When enrolling for this system 110, the system 110 may be configured to capture resident information indicating that the resident agrees to retain the obligation to pay provider utility charges and that the community will not be obligated to make payment until receiving resident's funds or payment information (e.g., credit card). A resident 122 may be able to enroll into this system through the lease or a contract with property management, a utility provider, the owner, a third party billing company directly, or any other approved methods.

It may be desirable, in some implementations, to further integrate the information, for example by payor. A single payor may be responsible for the charges for several units. In this case, an integrated bill collecting the information for the units associated with the payor may be generated. As described above, a single invoice may be used to communicate disparate charges and receive payment therefore.

Figure 4:
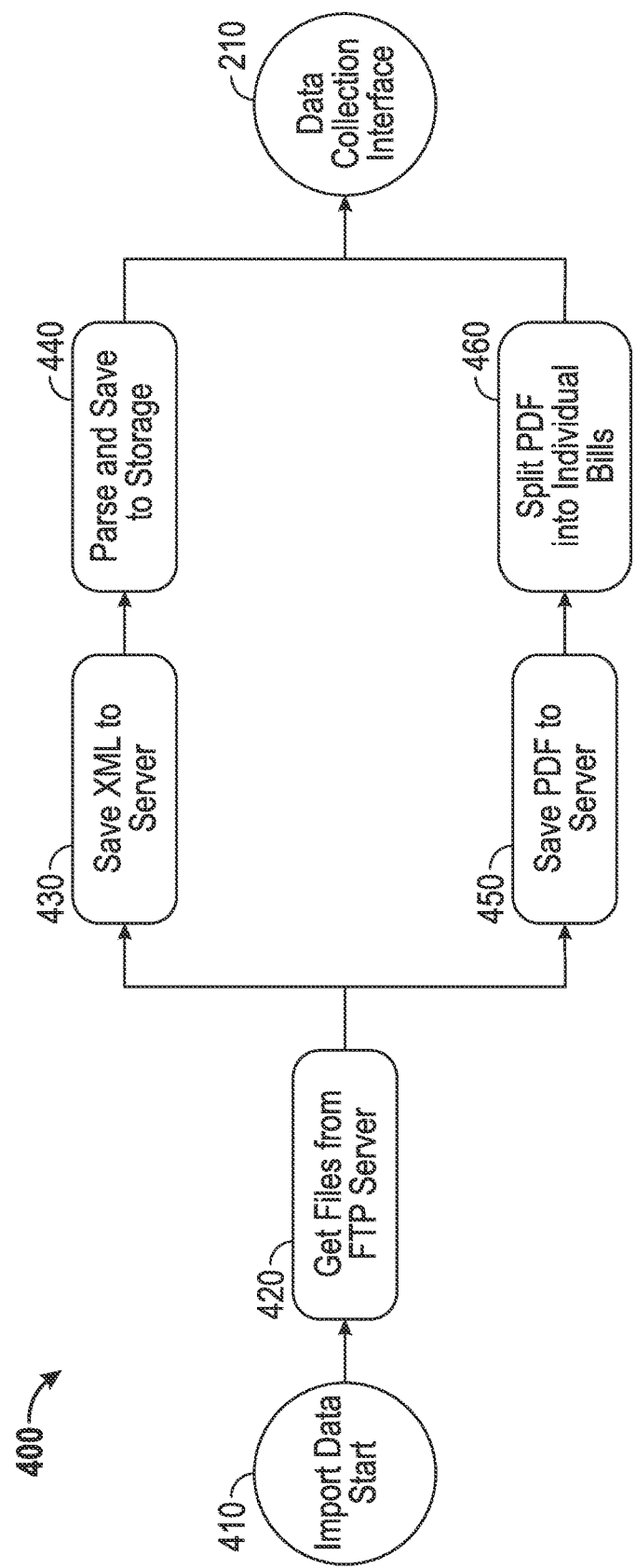
FIG. 4 is a flowchart of an exemplary process for receiving resource consumption or usage information.

FIG. 4 is a flowchart of an exemplary process 400 for receiving and processing resource consumption or usage information. The process 400 begins at block 410 when the processor 202 and/or usage data collection interface 210 may request resource consumption or usage information from one or more of a plurality of service providers 102.

Figure 11:
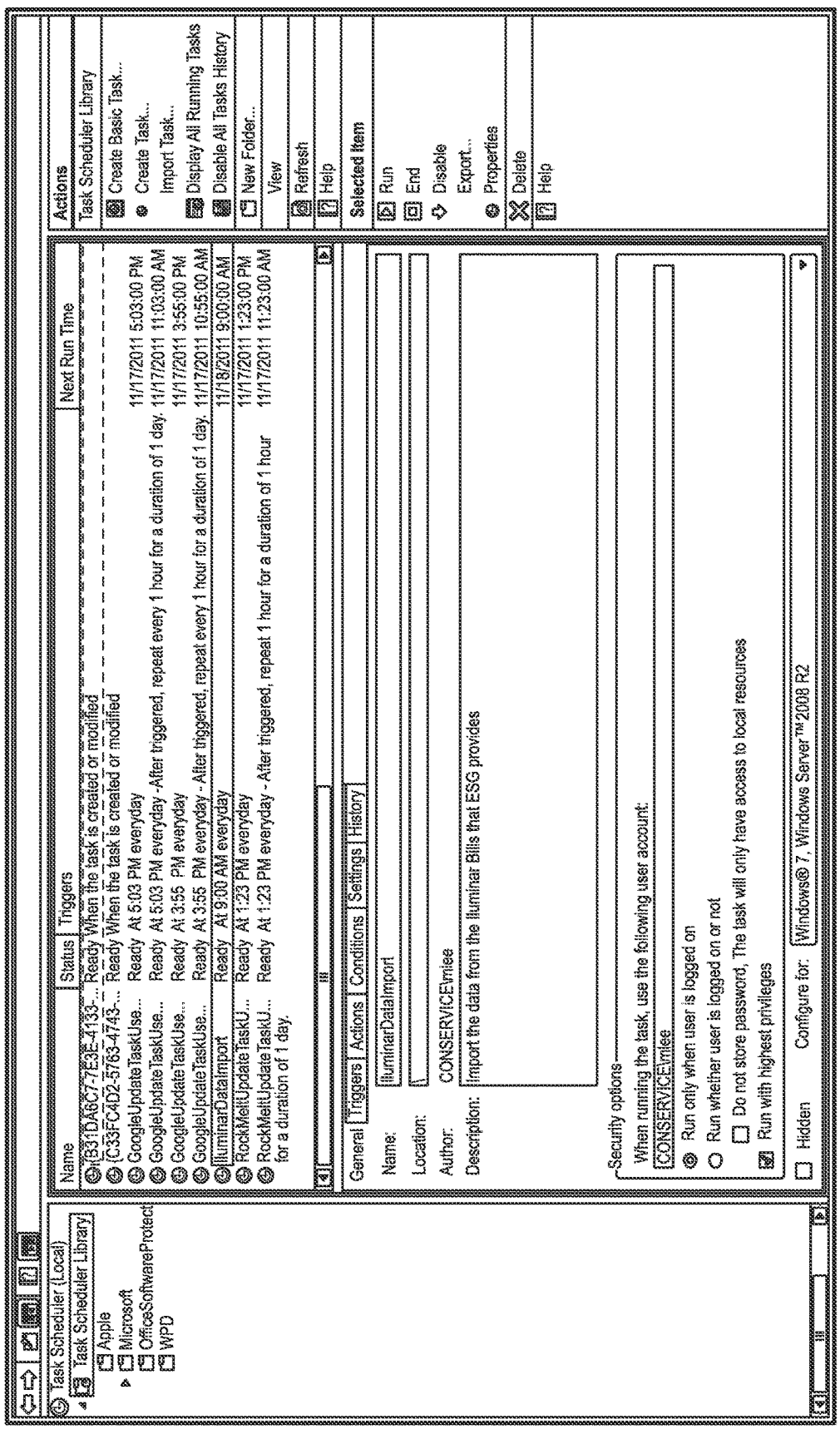
FIG. 11 shows an example scheduler that may be included in a multi-unit bill distribution system.

At block 420, files indicative of resource consumption or usage may be obtained using an electronic file sharing software, such as from a file transfer protocol (FTP) server by the usage data collection interface 210. In some implementations, the files may also include the cost information for the resources provided to each unit. For ease of explanation, the implementations described will use FTP for electronic file sharing, however other electronic file sharing formats or protocols may be used to obtain files indicative of resource consumption or usage. In some implementations, the transfer may be secured or encrypted. The usage data collection interface 210 may communicate through the network 104 and contact a provider from one or more of a plurality of service providers 102. For example, the usage data collection interface 210 may directly receive information indicative of resource consumption or usage information for properties, such as property 120, or units 110. In one aspect, the information indicative of resource consumption or usage may include information indicative of electricity usage of the property 120 or the unit 108. In other aspects, usage data collection interface 210 may contact one or more third parties that provide the resource consumption or usage information, such as electricity usage, for the property 120 or unit 108. Furthermore, the usage data collection interface 210 may receive information covering multiple properties or units as required by owners, managers, or other authorized individuals or groups. Although the usage data collection interface 210 has been described as contacting the third parties to obtain the resource consumption or usage information, in some implementations it may be desirable for the third parties to provide the resource consumption or usage information without being contacted. For example, a third party may provide the usage information according to a transfer schedule (e.g., weekly, monthly, quarterly, daily) to the usage data collection interface 210. Some implementations may include a scheduler as shown in FIG. 11 and described in further detail below.

The path flow for the files may split between block 430 and block 450. At block 430, the files from the FTP server 420 may be saved in a structured format such as extensible markup language (XML) format, or a similar spreadsheet, table, or uploadable file format to the multi-unit bill distribution system 110. For ease of explanation, reference will be made to XML, however, other uploadable types of documents may be supported without departing from the scope of the disclosure. In some aspects, the files may be saved to the storage 204 without further modification. In other aspects, as illustrated in block 440, the files may be parsed by the processor 202 and then saved to the storage 204.

At block 450, the files from the FTP server 420 may be saved in a structured document type, such as a portable document format (PDF). For ease of explanation, reference will be made to PDF as the standard document type, however, other standard document types may be supported without departing from the scope of the disclosure. In some aspects, the files may be saved to the storage 204 without further modification. In other aspects, as illustrated in block 460, the files may be split into individual bills or files by the processor 202 and then saved to the storage 204.

Figure 5B:
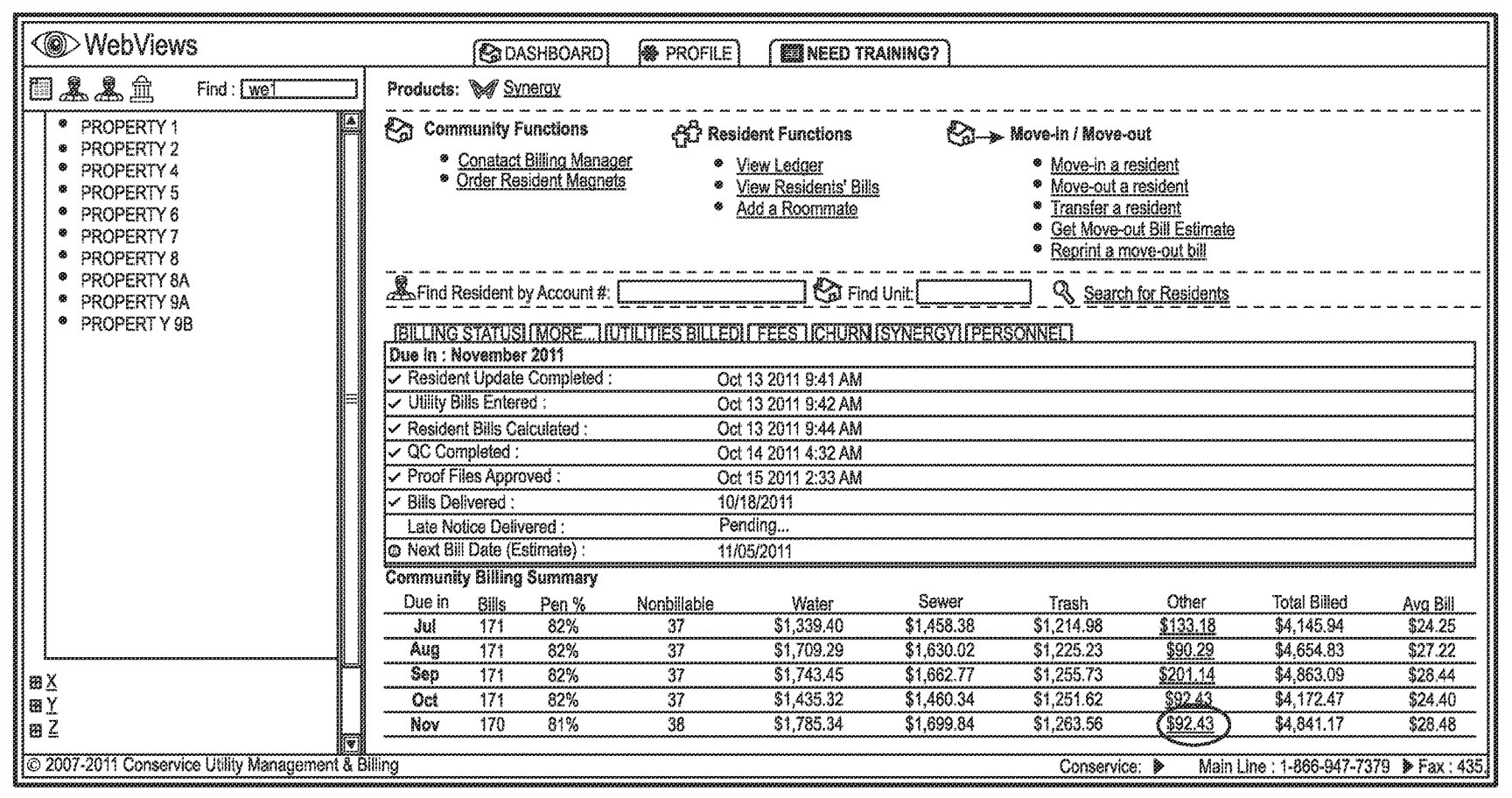

FIGS. 5A and 5B illustrate example reports based on exemplary aspects. The reports illustrate how a multi-family dwelling 106 may review resource consumption or usage information of numerous units 110 within the property 120 managed by the multi-family dwelling 106.

FIG. 5A shows an interface presenting resident account information and utility charges incurred by each unit. The information shown in FIG. 5A is presented in a table or a spreadsheet view. Other presentation formats may be used to display the information (e.g., graphical, charts, drill-down).

As shown, the first seven columns (#, Resident, Account #, Unit, Move In, Mult, and Bedrooms) provide residency information about a unit, an associated resident, a rental contract, and account information. The remaining columns (E1 Electric Supply Charges, E4 Advanced Metering Fee, E5 Electric Tax Charges, Electricity Service Fee, Sewer, Sewer Base, Trash, Water, Water Base Charge, and Current Balance) may provide details on resource consumption, usage charges, taxes, etc. incurred by the unit and the associated resident. As shown, the remaining columns may be stated in terms of dollars owed or paid by a unit or resident. In other aspects, the remaining columns may provide data indicative of resource consumption or usage. In some implementations, other information may be included such as historical data, links to other documents (e.g., hyperlinks), and the like.

FIG. 5B shows a website presentation of utility charges incurred by units 110 within a property 120. In one embodiment, the presentation may show details of when bills were paid and when future bills are due. Additionally, in other aspects, the utility charge information may be sorted and processed in various ways to facilitate easy review or billing. For example, the example presentation in FIG. 5B shows the charges sorted by month (July, August, September, October, and November) as well as category (water, sewer, trash, other). Moreover, in yet other aspects, summary information may be displayed such as total billings or average bill amounts.

Figure 6A:
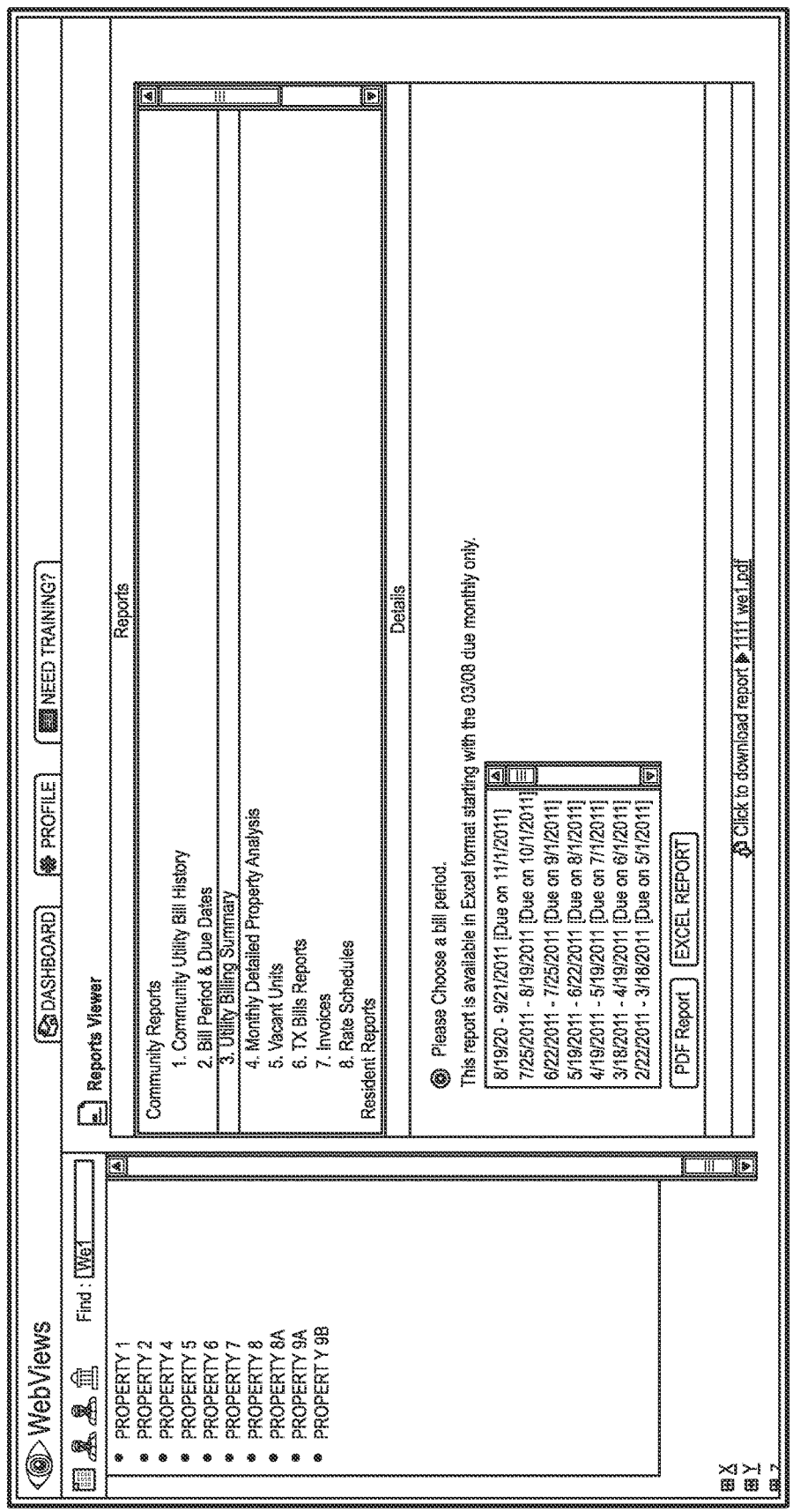

FIGS. 6A and 6B illustrate example user interfaces based on other exemplary aspects. For example, the user interfaces illustrated in FIGS. 6A and 6B may provide access to resource consumption or usage information stored in the multi-unit bill distribution system 110 to a unit 108, a resident, or a landlord 106.

The report shown in FIG. 6A illustrates that information such as a utility bill summary may be available for review. The information indicative of resource consumption or usage may be reviewed in various formats such as by time period, dollar amounts, or file types, among other possibilities. In other aspects, a user may export information through a PDF file or Microsoft Excel Spreadsheet, or other standard electronic data formats. In yet other aspects, the interface may provide a way for the export of information to an expense management system for preparation of bills external to the multi-unit bill distribution system.

The illustration shown in FIG. 6B demonstrates an example view of the account history for a particular unit billed by the multi-unit bill distribution system 110. The charges displayed may be grouped by time period, type, and/or category of resource consumption or usage.

Figure 7A:
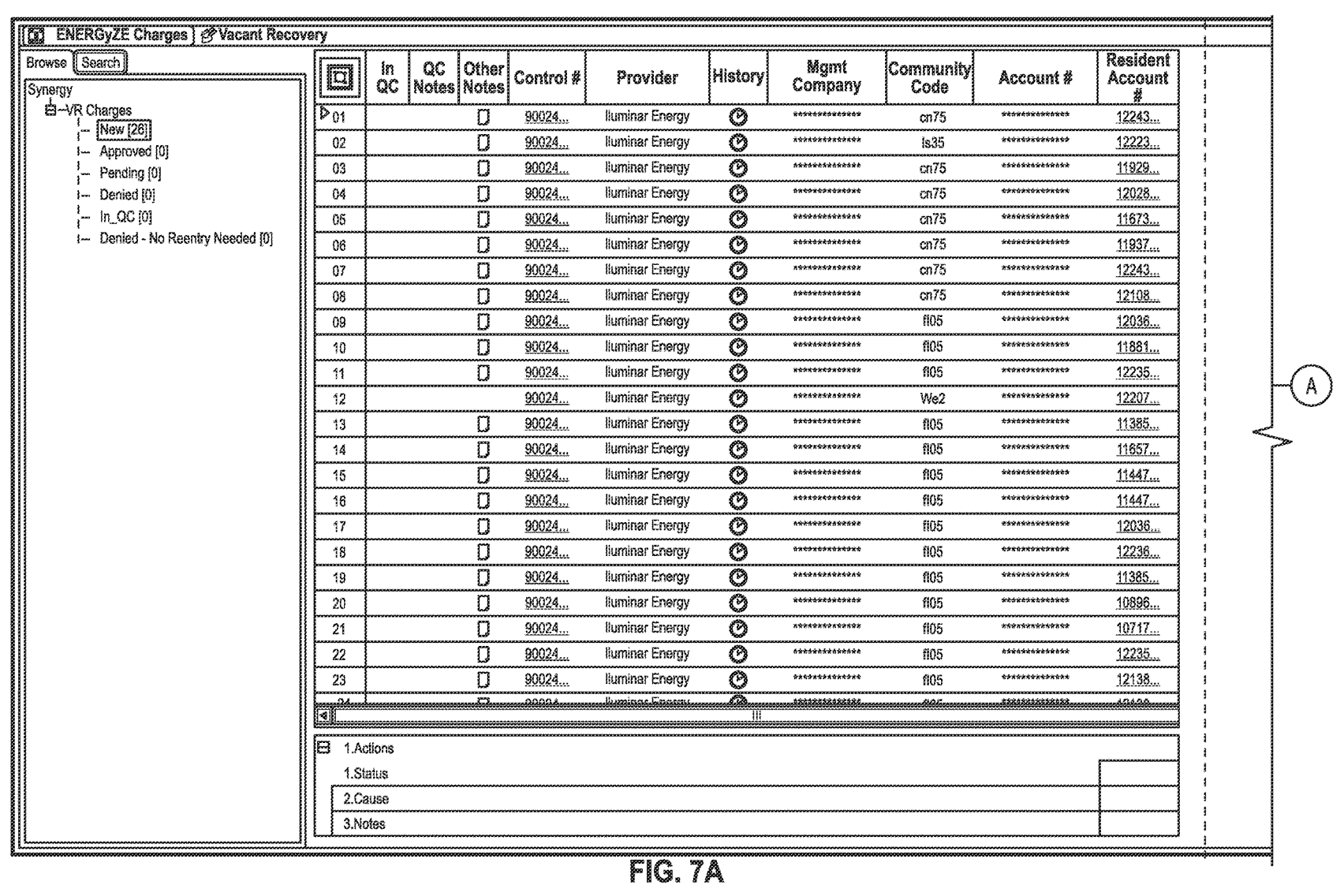
Figure 7B:
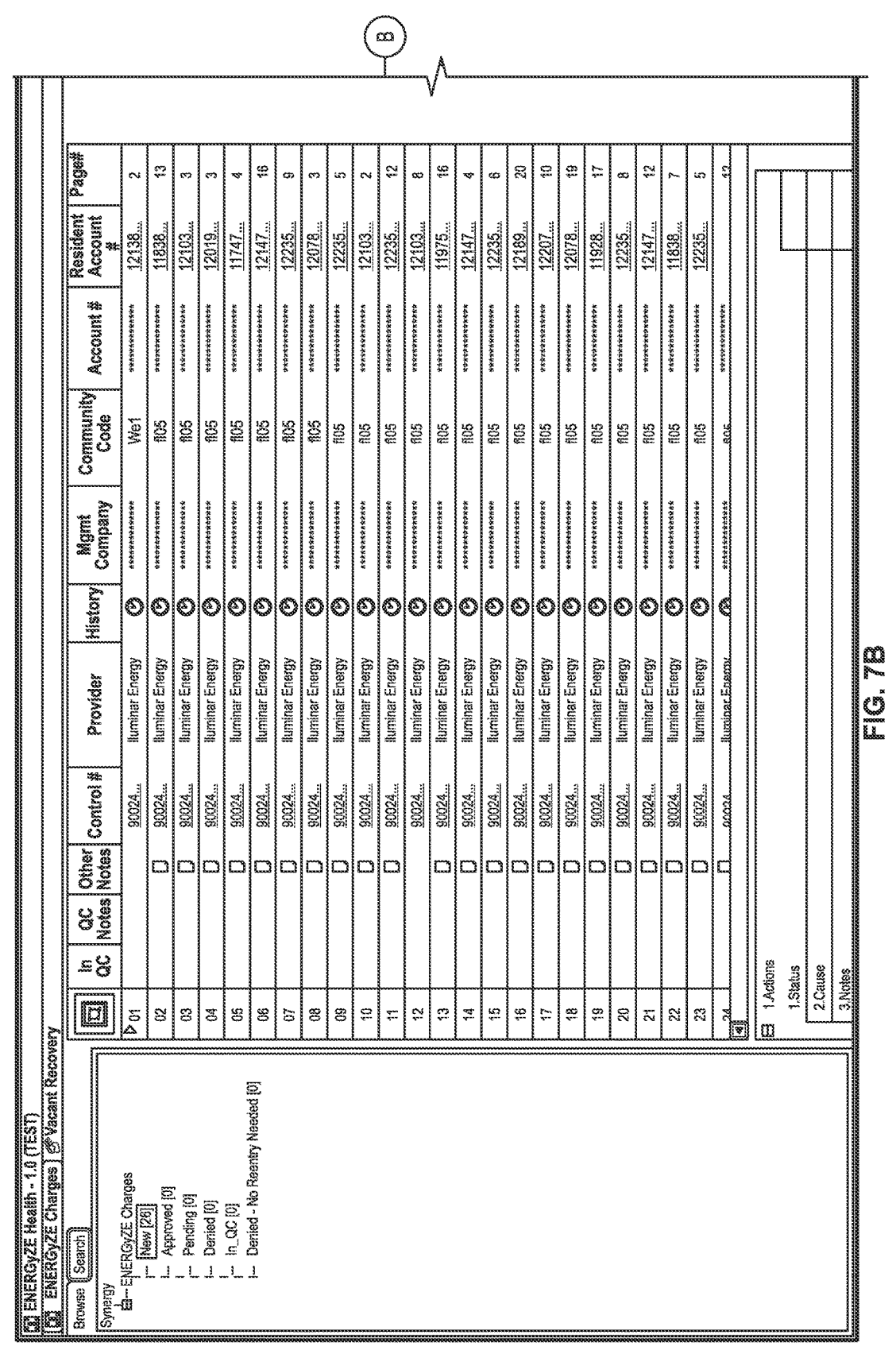

FIGS. 7A and 7B illustrate example interfaces that may be used to coordinate the multi-unit bill distribution system. The illustration shown in FIG. 7A demonstrates an example interface presenting a table of charges as they are associated with individual units 108 separated out by each utility service provider's 102 account after they have been separated out by the multi-unit bill distribution system 110. This interface identifies which residents 122 are signed up for the program and which are not.

The illustration shown in FIG. 7B demonstrates an example interface presenting charges as they are ready to be verified within the system. This interface allows multi-family property owners 106 to issue charges to residents not utilizing the multi-unit bill distribution system 110, but still receiving power in the name of the community 120.

Figure 8:
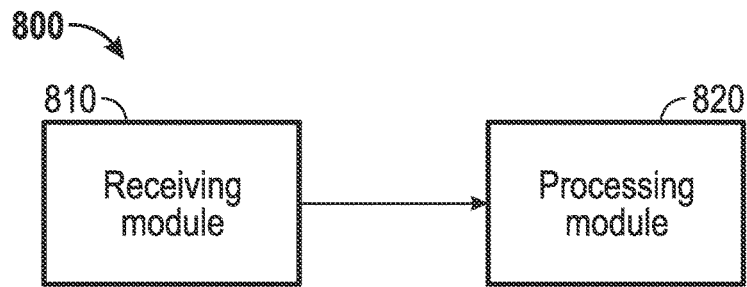
FIG. 8 is a functional block diagram of an exemplary system for collecting and utilizing resource consumption or usage information.

FIG. 8 is a functional block diagram of an exemplary system 800 for collecting and utilizing resource consumption or usage information. The system 800 includes a receiving module 810 for receiving residency information for a unit 108 associated with a resident, as well as receiving resource consumption or usage information associated with the unit 108 from a plurality of disparate utility service providers 102, including information indicative of electricity usage. The receiving module may be configured to perform one or more of the functions discussed above with respect to the blocks 310 and 320 of FIG. 3.

The system 800 further includes a processing module 820 configured to generate a consolidated data set based on the resource consumption or usage information for the unit. The consolidated data set may be used to prepare other reports or bills for landlords 112 or residents.

The consolidated data set may be further utilized to perform quality checks during various stages of data flow in the multi-unit bill distribution system 110. The information in the consolidated data set may, for example, be compared to information received from service providers 102, the multi-family property owner 106, the landlord information interface 214 or third party billing company 124, to prevent or correct errors. In some implementations, the multi-unit bill distribution system 110 may perform a comparison between the consolidated data set and information received from a provider. The quality check may be random wherein a random sample of data sets is selected for quality control. The quality check may be total meaning the consolidated data sets will all be checked against a total amount due to each provider. In this case, if any discrepancy is found between the total amount due to a particular provider and the amount billed to the residents for a particular service, appropriate corrective action may be taken (e.g., contact the provider, contact the landlord, re-run the data sets).

In some implementations, the data received from the service providers 102 or third parties may be validated. The validation may be through inspection or comparison of aspects of the imported data such against the information stored as the number of records imported, and total amounts charged. It may be desirable to provide an import quality control interface to present the aspects to be compared. This quality check may be performed each day after the "Import Data" step has finished. In some implementations, this quality check may compare the data that is in the database against what is on the PDF. Also, the bills that were rejected as failing quality control may need to be checked to make sure the rejection was correct. The bills will be marked as ready to go onto the next step when they pass these checks. In some implementations, a quality control interface may be provided by the multi-unit bill distribution system 110 to present the bill data that was imported from the XML and receive signals indicating whether the bill data matches with the data on the received PDF. The interface may be further configured to present bills that were rejected according to criteria for valid bills. The criteria may include bills detected to contain the same data as a previously imported bill, bills for dollar amounts that exceed a particular threshold, bills for dollar amounts that fall below a particular threshold, bills with billed amounts that are inconsistent with the usage amount (e.g., 100 kWHr usage and $1.00 charged), and the like.

In one aspect, the consolidated data set may be combined with one or more other consolidated data sets to prepare a combined data set. The combined data set may provide summary information for a multi-family property owner 106 or may provide general resource consumption and usage information to a resident or units 110. In other aspects, information indicative of resource consumption and usage may already combine data for more than one unit 108 or property 120. This summary may be compiled for any logical set of communities, including but not limited to communities or units belonging to the same owner, managed by the same entity, or otherwise affiliated. A summary report may be similar in some aspects to the combined data set and may be directly prepared in certain cases, such as when costs are allocated across units 110 by a multi-family property owner 106 as opposed to consumption or usage directly attributable to an individual unit 108.

Figure 9:
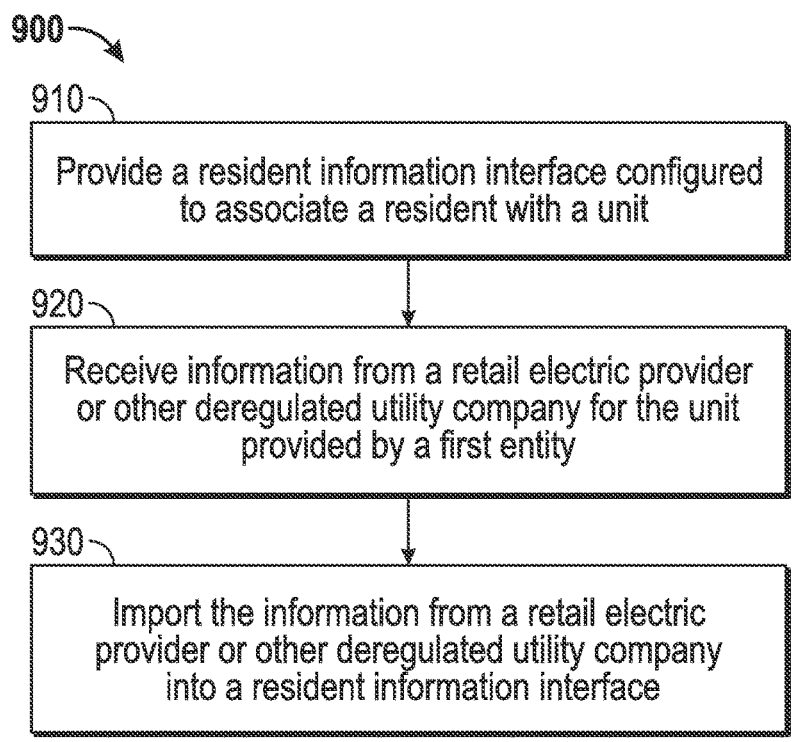
FIG. 9 is a flowchart of an exemplary method for providing a digital record pertaining to a multi-resident property via a computer network.

FIG. 9 is a flowchart of an exemplary method for providing a digital record pertaining to multi-resident property via a computer network. The method 900 may be used by a multi-family property owner 106 or a third party billing company 124 to prepare for a resident a single bill comprising retail electric provider usage and cost charges, trash, sewage, and cable, among other charges. Although the method 900 is described below with respect to the elements of the multi-unit bill distribution system 110 combined with the link to the utility service provider 102, those having ordinary skill in the art will appreciate that other components may be used to implement one or more of the steps described herein.

At block 910, a multi-unit bill distribution system 110 may be provided to associate a resident with a unit. The multi-unit bill distribution system 110 may comprise the components illustrated in FIG. 2, among other possible components. The association may include storing an electronic residency record for the unit associated with a resident. The electronic residency record may include one or more of a unit number, a resident name, a billing address, other contact information (e.g., email, telephone, Internet address), and payment information as described above.

At block 920, the information indicative of electricity usage for the unit 108 may be received. The information may be provided by a first entity. The first entity may be a retail electric provider or other deregulated utility company. In yet other aspects, the information may be provided by multiple entities. The receipt of information may be performed by the usage data collection interface 210 through the network 104, for example. The information may be received as part of an electronic record. The electronic record may be received in a structured or semi-structured machine readable format (e.g., XML, comma separated values, fix length fields, serialized objects, or the like). The electronic record may include information indicative of at least one of electricity usage for the unit and pricing information for the electricity used.

At block 930, at least a portion of the electronic record is imported into the multi-unit bill distribution system. The portion may include, for example, the information indicative of electricity usage. The importing of information may be performed by the processor 202 and the information may be stored in the storage 204, for example. The imported information may be specifically imported into the resident information interface of the multi-unit bill distribution system. A resident may subsequently view the consumption information for their unit via the resident information interface.

Figure 10:
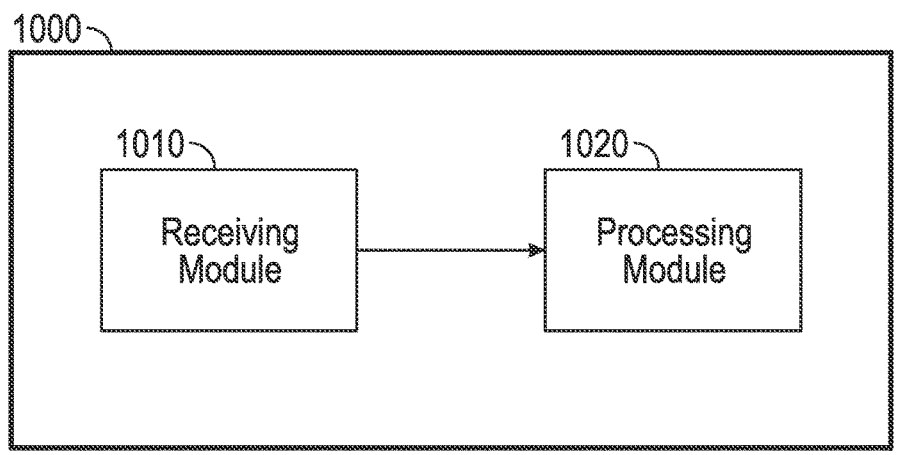
FIG. 10 is a functional block diagram of an exemplary multi-unit bill distribution system.

FIG. 10 is a functional block diagram of an exemplary multi-unit bill distribution system 1000. The multi-unit bill distribution system 1000 may be configured to associate a resident with a unit 108.

The multi-unit bill distribution system 1000 may comprise a receiving module 1010. The receiving module 1010 may store and/or receive an electronic record including information indicative of electricity usage for the unit 108 provided by a first entity. The receiving may be performed by the usage data collection interface 210 and/or processor 202, for example.

The multi-unit bill distribution system 1000 may further comprise a processing module 1020. The processing module 1020 may import information indicative of electricity usage such as into a resident information interface as described herein. The importing process may be performed by the processor 202, for example. The imported information may be stored in the processor 202 memory or may be stored in the storage 204.

FIG. 11 shows an example scheduler that may be included in a multi-unit bill distribution system. The scheduler may be configured to obtain information from providers, as described above. The scheduler may be configured to scheduler and/or automate other functions of the multi-unit bill distribution system such as generating consolidated reports, providing bills, storage backups, and the like. The scheduler shown may allow the function to be triggers such as by date, system event (e.g., appearance of a file on the file system), email, or text message. The scheduler may include conditions which must be satisfied before a function may begin such as adequate disk space, idle processor time, or presence of a data file. The scheduler may be further configured to report status of a scheduled function (e.g., start, stop, errors) such as via email, text message, voice message, or event log.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. A storage media may be a non-transitory storage media. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of providing a digital record pertaining to multi-resident property via a computer network, the method comprising:
   storing, via a first device, an electronic residency records for units of the multi-resident property;
   monitoring, via a metering device, resource consumption or usage for the multi-resident property to obtain a resource consumption or usage electronic record for the multi-resident property, the resource consumption or usage electronic record including information indicative of one or more of electricity usage for the units of the multi-resident property over a period of time and pricing information of the electricity used for each unit over the period of time;

detecting, by the first device, a consolidation triggering event indicating that resources are available for the first device to generate consolidated electronic data sets;

in response to obtaining the resource consumption or usage electronic record from the metering device and detecting the consolidation triggering event, identifying, via the first device, specific information for a unit included in the resource consumption or usage electronic record including a first unit identifier corresponding to a second unit identifier included in an electronic residency record for the unit; and generating, via the first device, a consolidated electronic data set based on the specific information for the unit as monitored via the metering device, the consolidated electronic data set including:
the second unit identifier;
date information indicating the period of time to which the consolidated electronic data set relates,
a first entry including an electricity charge for the unit for the period of time, the electricity charge generated using the electricity usage and pricing information received from the retail electric provider information,
a second entry indicating resource consumption or usage information for a landlord provided service, the resource consumption or usage information for the landlord provided service being one of water fee, sewer fee, trash fee, pest fee, cable service fee, rent, and pet fee,
a total amount due for the unit for the time period, the total amount generated using the electricity charge and the resource consumption or usage information for the landlord provided service; and wherein the method further comprises:
identifying, via the first device, a random entry in the consolidated electronic data set;
comparing, via the first device, resource consumption or usage information for the random entry to a resource consumption or usage information record received from a provider of the resource consumption or usage information record; and
generating, via the first device, an error detection result based on the comparison.

2. The method of claim 1, wherein the information indicative of electricity usage of the units of the multi-resident property is measured in a location comprising a deregulated electricity market including retail electric providers.

3. The method of claim 1, wherein the pricing information indicates one of a per service unit cost, a demand level cost, a time of use cost.

4. The method of claim 3, wherein the service unit of the per service unit cost includes one of therms, gallons, watts, kilowatts, or British thermal units.

5. The method of claim 1, further comprising:
providing at least a portion of the consolidated electronic data set to an expense management system.

6. The method of claim 1, further comprising:
receiving resource consumption or usage information from a retail electric provider and landlord provided services; and
comparing the consolidated electronic data set with the resource consumption or usage information received from the retail electric provider and the landlord provided services.

7. The method of claim 6, further comprising:
reviewing the resource consumption or usage information that was excluded from the consolidated electronic data set.

8. The method of claim 1, further comprising:
identifying vacant units included in the units of the multi-resident property; and
generating a vacancy electronic data set, the vacancy electronic data set including:
the date information indicating the period of time to which the vacancy data set relates,
a first vacant unit entry including a total electricity charge for the vacant units for the period of time, the total electricity charge generated using the first entry of the respective consolidated electronic data set for the vacant units,
a second vacant unit entry indicating total resource consumption or usage information for the landlord provided service, the total resource consumption or usage information for the landlord provided service generated using the second entry of the respective consolidated electronic data set for the vacant units, and
a total vacancy amount due for the vacant units for the time period, the total vacancy amount generated using the total amount due for each vacant unit.

9. The method of claim 1, further comprising:
combining more than one consolidated electronic data set to obtain a combined electronic data set.

10. The method of claim 9, further comprising:
providing at least a portion of the combined electronic data set to an expense management system.

11. The method of claim 1, wherein the residency record includes an indicator of enrollment, and wherein resource consumption or usage information associated with the unit are received based at least in part on the enrollment indicator.

12. The method of claim 1, wherein the residency record includes payment information.

13. The method of claim 12, further comprising processing a payment for the unit based at least in part on the consolidated electronic data set and payment information.

14. A method of providing a digital record pertaining to multi-resident property via a computer network, the method comprising:
providing, via a first device, an electronic resident information interface configured to associate a resident with a unit, the unit included in a plurality of units of the multi-resident property;
monitoring, via a metering device, electricity consumption information for the multi-resident property to obtain an electronic record including information indicative of at least one of electricity usage for the units of the multi-resident property over a period of time and pricing information for the electricity used over the period of time; and
detecting, by the first device, a consolidation triggering event indicating that resources are available for the first device to generate consolidated electronic data sets;
in response to obtaining the electronic record from the metering device and detecting the consolidation triggering event:

importing, via the first device, at least a portion of the electronic record into the electronic resident information interface by comparing at least a portion of an electronic residency record for the unit with the information included in the resource consumption or usage electronic record, wherein the electronic resident information interface includes:
  date information indicating the period of time to which the consolidated electronic data set relates,
  a first entry including an electricity charge for the unit for the period of time, the electricity charge generated using the electricity usage and pricing information received from the retail electric provider information,
  a second entry indicating resource consumption or usage information for a landlord provided service, the resource consumption or usage information for the landlord provided service being one of water fee, sewer fee, trash fee, pest fee, cable service fee, rent, and pet fee, and
  a total amount due for the unit for the time period, the total amount generated using the electricity charge and the resource consumption or usage information for the landlord provided service;
identifying, via the first device, vacant units included in the units of the multi-resident property; and
generating, via the first device, a vacancy electronic data set, the vacancy electronic data set including:
  the date information indicating the period of time to which the vacancy data set relates,
  a first vacant unit entry including a total electricity charge for the vacant units for the period of time, the total electricity charge generated using the first entry of the respective consolidated electronic data set for the vacant units,
  a second vacant unit entry indicating total resource consumption or usage information for the landlord provided service, the total resource consumption or usage information for the landlord provided service generated using the second entry of the respective consolidated electronic data set for the vacant units,
  a total vacancy amount due for the vacant units for the time period, the total vacancy amount generated using the total amount due for each vacant unit; and
wherein the method further comprises:
  identifying, via the first device, a random entry in the consolidated electronic data set;
  comparing, via the first device, resource consumption or usage information for the random entry to a resource consumption or usage information record received from a provider of the resource consumption or usage information record; and
  generating, via the first device, an error detection result based on the comparison.

15. The method of claim 14, further comprising:
transmitting at least a portion of the electronic record between the resident information interface and an expense management system.

16. The method of claim 14, further comprising:
receiving resource consumption or usage information from a retail electric provider and landlord provided services; and
comparing the imported portion of the electronic record with the electronic record received from the retail electric provider.

17. The method of claim 14, further comprising:
receiving another electronic record including additional resource consumption or usage information associated with the unit from a second entity disparate from the retail electric provider; and
importing a portion of the another electronic record into the resident information interface.

18. The method of claim 17, further comprising:
comparing the imported portion of the electronic record with the electronic record received from the first the retail electric provider; and
comparing the imported portion of the another electronic record with the another electronic record received from the second entity.

19. The method of claim 17, wherein the additional resource consumption or usage information comprises information indicative of consumption of a metered resource.

20. The method of claim 14, wherein associating a resident with a unit comprises associating an indicator of enrollment, and wherein information indicative of electricity usage for the unit are received based at least in part on the enrollment indicator.

21. The method of claim 14, wherein the resident information interface is further configured to receive payment information for a unit.

22. The method of claim 21, further comprising processing a payment for the unit based at least in part on the information from the retail electric provider and payment information.

23. A system for providing a digital record pertaining to multi-resident property, the system comprising:
  means for storing an electronic residency records for units of the multi-resident property;
  means for monitoring electricity consumption information for the unit of the multi-resident property to obtain a resource consumption or usage electronic record for the multi-resident property, the resource consumption or usage electronic record including information indicative of one or more of electricity usage for the units of the multi-resident property over a period of time and pricing information of the electricity used for each unit over the period of time;
  means for detecting, a consolidation triggering event indicating that resources are available to the system for generating consolidated electronic data sets;
  means for identifying, in response to obtaining the resource consumption or usage electronic record and detecting the consolidation triggering event, specific information for a unit included in the resource consumption or usage electronic record by comparing at least a portion of the electronic residency record for the unit with the information included in the resource consumption or usage electronic record;
  means for generating a consolidated electronic data set based on the resource consumption or usage electronic record for the unit as monitored via the means for monitoring, the consolidated data set including:
    date information indicating the period of time to which the consolidated electronic data set relates,
    a first entry including an electricity charge for the unit for the period of time, the electricity charge generated using the electricity usage and pricing information received from the retail electric provider information,
    a second entry indicating resource consumption or usage information for the landlord provided services, the resource consumption or usage information for the landlord provided service being one of water fee, sewer fee, trash fee, pest fee, cable service fee, rent, and pet fee, and a total amount due for the unit for the time period, the total amount generated using the electricity charge and the resource consumption or usage information for the landlord provided service; and an error detection circuit configured to:
identify a random entry in the consolidated electronic data set;
compare resource consumption or usage information for the random entry to a resource consumption or usage information record received from a provider of the resource consumption or usage information record; and
generate an error detection result based on the comparison.

24. The system of claim 23, wherein the means for storing an electronic residency record comprises a first network interface, wherein the means for monitoring resource consumption or usage electronic record comprises a meter, and wherein the means for generating a consolidated electronic data set comprises a processor.

25. A non-transitory computer readable storage medium comprising instructions executable by a processor of an apparatus to cause the apparatus to:

store an electronic residency records for units of the multi-resident property;

monitor, via a metering device, a resource consumption or usage for the multi-resident property to obtain a resource consumption or usage electronic record for the multi-resident property, the resource consumption or usage electronic record including information indicative of one or more of resource usage for the units of the multi-resident property over a period of time and pricing information of the resource used for each unit over the period of time;

detect a consolidation triggering event indicating that resources are available to the apparatus for generating consolidated electronic data sets;

in response to obtaining the resource consumption or usage electronic record from the metering device and detection of the consolidation triggering event, identify specific information for a unit included in the resource consumption or usage electronic record by comparing at least a portion of an electronic residency record for the unit with the information included in the resource consumption or usage electronic record; and generate a consolidated electronic data set based on the specific information for the unit as monitored via the metering device, the consolidated electronic data set including:

date information indicating the period of time to which the consolidated electronic data set relates, a first entry including an electricity charge for the unit for the period of time, the electricity charge generated using the electricity usage and pricing information received from the retail electric provider information, a second entry indicating resource consumption or usage information for a service provided by another resource provider, and a total amount due for the unit for the time period, the total amount generated using the electricity charge and the resource consumption or usage information for the service;

identify a random entry in the consolidated electronic data set;

compare resource consumption or usage information for the random entry to a resource consumption or usage information record received from a provider of the resource consumption or usage information record; and generate an error detection result based on the comparison.

* * * * *